United States Patent

[11] 3,601,095

| [72] | Inventor | Hans Olof Lennart Olsson<br>Simontorps Sateri, Sweden |
|---|---|---|
| [21] | Appl. No. | 857,313 |
| [22] | Filed | Sept. 12, 1969 |
| [45] | Patented | Aug. 24, 1971 |
| [73] | Assignee | AB Vapor<br>Lund, Sweden |
| [32] | Priority | Sept. 26, 1968 |
| [33] | | Sweden |
| [31] | | 12,964/68 |

[54] EQUIPMENT AND METHOD TO FACILITATE THE REARING OF THE YOUNG OF SPAWN-PRODUCING CRUSTACEANS
5 Claims, 2 Drawing Figs.

| [52] | U.S. Cl. | 119/2 |
|---|---|---|
| [51] | Int. Cl. | A01k 61/00 |
| [50] | Field of Search | 119/2, 3, 5, 4 |

[56] References Cited
UNITED STATES PATENTS

| 1,639,555 | 8/1927 | Clark | 119/2 |
|---|---|---|---|
| 3,464,387 | 9/1969 | Martinez | 119/5 |

*Primary Examiner*—Hugh R. Chamblee
*Attorney*—Pierce, Scheffler & Parker

ABSTRACT: Apparatus to facilitate rearing of the young of spawn-producing crustaceans, particularly crayfish, comprises a boxlike structure which includes an enclosure having a foraminous floor upon which one or more mother crayfish are supported and through which the young drop, after hatching, into a collection compartment which is also provided with a foraminous floor. The foraminous floor which supports the mother crayfish is constituted by a wire netting having a mesh size small enough to prevent passage of the mother crayfish but large enough to permit free passage of the newly hatched young into the underneath collection department, and the floor of the collection department is also a wire netting having a mesh size small enough to prevent escape of the young. The enclosure for confining the mother crayfish is provided with a cover also made from wire netting and through which food can be passed.

Patented Aug. 24, 1971  3,601,095
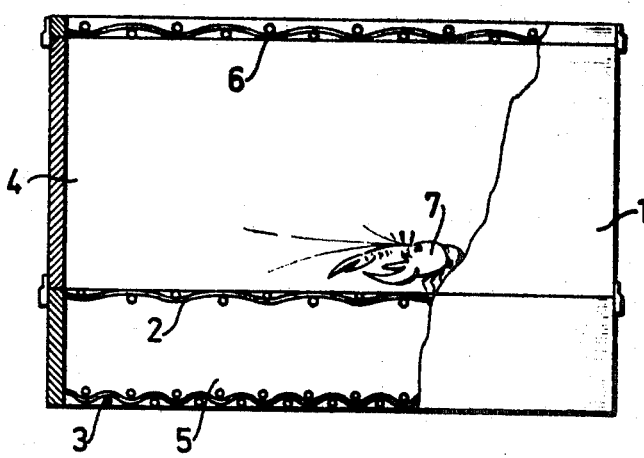
Fig.1
Fig.2
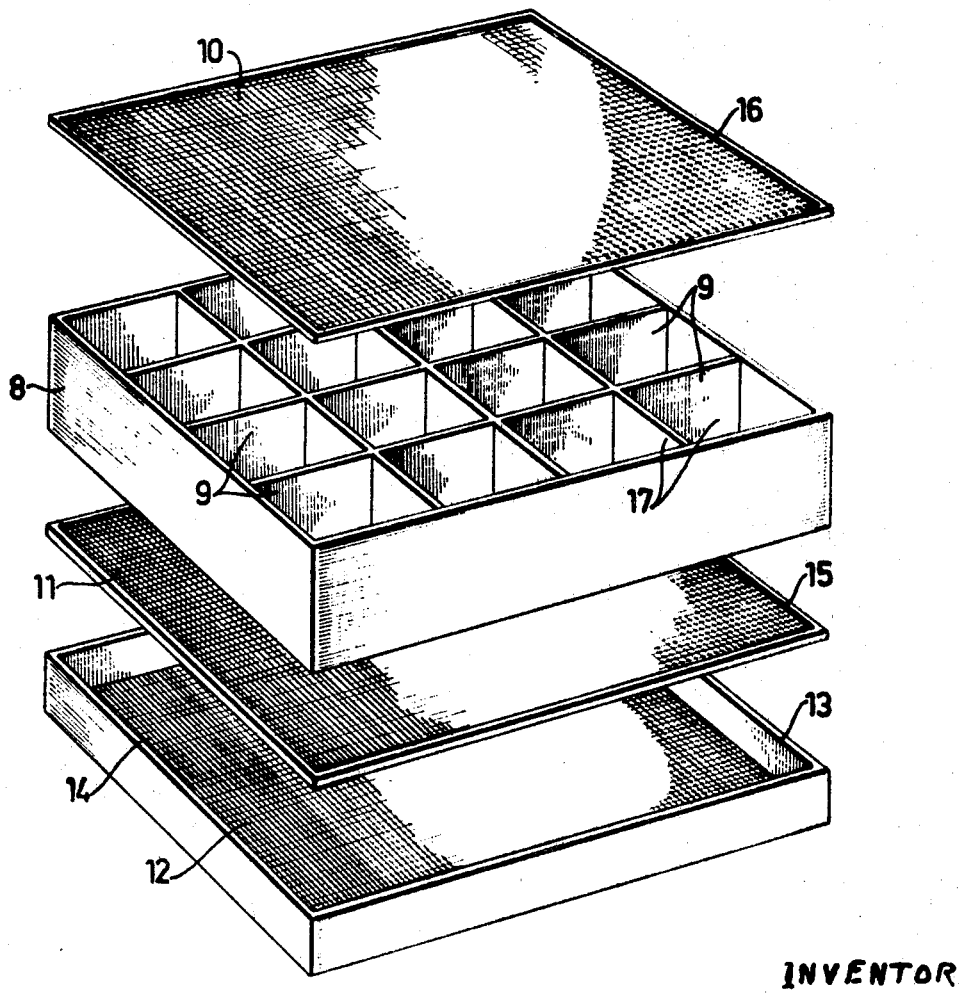
INVENTOR
Hans Olof Lennart Olsson
By Pierce, Scheffler & Parker
Attorneys

EQUIPMENT AND METHOD TO FACILITATE THE REARING OF THE YOUNG OF SPAWN-PRODUCING CRUSTACEANS

This invention relates to equipment and a method to facilitate the rearing of the young of spawn-producing crustaceans, e.g. crayfish. The need for the rearing of the young of spawn-producing crustaceans, chiefly crayfish, is becoming steadily greater. The reason for this increased need is that the river crayfish common in Europe is greatly diminishing in numbers owing to the spread of the crayfish disease, and the stock of crayfish must therefore be replenished in order that the stock of crayfish should be kept at a level which bears a reasonable relationship to the demand. Attempts have naturally been made to breed species that are more resistant than the river crayfish to the crayfish disease, and relatively resistant crayfish species, e.g. crayfish of the American family Pacifastacus, have also been found.

It has been found however that there are great difficulties in collecting the young of crayfish, since these conceal themselves in inaccessible places. Attempts have been made to rear the young in basins, but these attempts have for the most part been unsuccessful, since the crayfish by cannibalistic eat up each other's spawn and the bigger crayfish kill the young ones.

Very good results can be achieved however in rearing the young of crayfish with the aid of the equipment and the method in accordance with the invention. The equipment in accordance with the invention is characterized by at least one enclosure defined by sidewalls, in which it is intended that a mother crayfish should be kept; by a foraminous bottom wall of netting or grating defining the lower boundary of the enclosure and establishing a floor to support the mother crayfish; by a part covering the enclosure, and by a collection compartment for the young, situated beneath the bottom wall, this collection department also being provided with a foraminous bottom wall consisting of netting or grating. The mesh size of the foraminous floor supporting the mother crayfish must be small enough to prevent passage of the mother crayfish but large enough to permit free passage of the newly hatched young.

The constructional version of the invention will be described below by reference to the enclosed diagrammatic drawing, in which FIG. 1 shows in partial section, equipment in accordance with the invention which contains mother animal, and FIG. 2 shows equipment in accordance with the invention containing several spaces or compartments, to contain mother animals.

The equipment shown in FIG. 1 consists of a rectangular enclosure 4 which is defined in part by four sidewalls 1. The enclosure 4 is provided with a separable foraminous bottom 2 consisting of netting or grating, preferably of metal wire e.g. plastic-coated metal wire, the mesh of which is such that the young when hatched can fall through the net, while the mother animal can be placed upon and supported by the net without difficulty. The enclosure 4 is covered at its top by another net 6, the purpose of which is to prevent the mother animal 7 from leaving the enclosure 4. A compartment is situated below the bottom net 2 for the collection of the young. The sidewalls of the compartment 5 are best made of wooden or plastic framing while its bottom is best made of a fine-mesh net 3 of metal wire or threads of natural or synthetic fiber. The construction shown in FIG. 2 consists of a number of frames of the same size which are designed so as to be capable of being stacked on top of one another and thereby forming a unit. The central part of the said unit is the frame 8, which may be of wood or plastic, which is fitted with a number of partition walls 9 delimiting a number of spaces or compartments 17 that are all about the same size. The compartments 17 in the frame 8, which are open at the top and bottom, are to be covered at the top by a net 10 stretched over a frame 16 which is common to all the compartments 17. The bottom of the compartments 17 consists of a net 11 stretched over a frame 15 which is common to all compartments. The collection space 14 consists of a frame construction 13 at the bottom of which there is a fine-mesh net 12.

By stacking the frames 16, 8, 15 and 13 on top of each other in that order from the top downwards, and by possibly securing them in the stacked configuration, there will be formed a number of closed spaces or compartments 17 in which mother animals can be placed and in which they will remain until the young have been hatched. The procedure in rearing the young is largely as follows: the mother animal 7 is first placed in the space 4 or 17 respectively, after which food may be supplied to the animal through the net 6 or 10. In order that the food should not fall through the bottom net 2 or 11, the meshes of the nets 6 and 2 or 10 and 11 respectively are to be adjusted in such a way that the meshes of the nets 6 and 10 are larger than those of the nets 2 ans 11. The sizes of the particles of food must naturally also be such that they can pass through the nets 6 or 10 respectively, but not through the nets 2 or 11. After the mother animal has been placed in the enclosures 4 or 17 respectively, the temperature and quality of the water are regulated in such a way that hatching is encouraged. When the young crayfish are hatched, which occurs 2–7 months after the spawn has been deposited, the young immediately fall through the net 2 or 11 into the collection compartments 5 or 14 respectively. The collection compartments should be constructed so that the young can be removed from them easily for transfer to basins in which they can develop without the danger of being attacked and killed by larger crayfish. When the young have attained such a size that they are considered capable of fending for themselves in natural surroundings, they are ready to be placed into a suitable watercourse. For rational rearing of young crayfish, the construction in accordance with FIG. 2 is naturally to be preferred, and it is possible to save space further by stacking vertically a number of complete units, each containing spaces for mother animals, bottom netting, cover netting and collection compartment. It may possible to construct a collection compartment 12 common to a number of rows of vertically stacked compartments 17 containing mother animals, in which case the young when hatched will fall from the upper rows through the bottom nets of the compartments 17 below, so as to come finally to the common collection compartment 12.

The constructional version of the invention shown here has been found particularly suitable, but it is naturally possible, within the framework of the idea underlying the invention, to modify the design of the equipment in a number of ways. It is thus unnecessary to have a separate frame for the bottom net 11, and it may in some cases be directly fastened, in a convenient way, to the framing 8 forming the compartments. It is however convenient from the point of view of cleaning to have separate frames as in the version described. It is possible furthermore to replace the collection space 13 for several frames 8 by a common collection vessel with circulating water, so as to effect centralized collection of the young crayfish. It is also possible to form the collection space with the aid of a sack or bag made from metal wire or natural fiber netting. In the practical tests carried out, it has been found that the compartments for the mother animals can be kept comparatively small, about 0.5–1 $dm.^2$ per compartment. Netting of brass or stainless steel wire or plastic-coated wire of these materials has been found a suitable material for the bottom net and the covering net, and a mesh of 10–30 mm. has been used for the bottom net, and it is naturally important that the mother animal can lie on the bottom net without parts of the animal such as tail of claws falling through the netting. It has been found convenient to use a bottom net with a mesh of between 5 and 20 mm, but a mesh of 10 mm. has been used for preference. The net at the bottom of the collection compartment may have a very fine mesh and must in any case be so fine meshed that the young do not fall through the net. It will be evident from the above that the mesh sizes of the netting must be chosen with regard to the sizes of the mother animals, the young and the food, if any, supplied.

It has been found that very high production of young crayfish can be achieved by means of the equipment in accordance with the invention, the reason being that the spawn of the mother animals is not eaten up by other crayfish and that the young when hatched cannot be attacked by larger crayfish.

I claim:

1. Apparatus to facilitate the rearing of the young of spawn-producing crustaceans such as crayfish which comprises a boxlike enclosure established by sidewall, bottom and top members, said bottom member serving as a floor upon which to support the mother crayfish and being formed from a grating having a mesh size small enough to prevent passage of the crayfish but large enough to permit free passage of newly hatched young, said top member serving as a cover to confine the crayfish and being formed from a grating having a mesh size larger than that of said bottom member to permit passage of food to feed the crayfish, and means providing a compartment below said bottom member for collecting the newly hatched young when they drop through said bottom member, said collection compartment being comprised of sidewall and bottom members, and said bottom member being formed from a grating having a mesh size small enough to prevent passage of the young 2. Apparatus as defined in claim 1 to facilitate rearing of the young of spawn-producing crustaceans such as crayfish wherein the grating forming said bottom member which serves as a floor to support the mother crayfish has a mesh size of about 10 mm. and wherein the grating forming said top member through which food is passed has a mesh size of about 20 mm.

3. Apparatus as defined in claim 1 to facilitate rearing of the young of spawn-producing crustaceans such as crayfish wherein said enclosure is provided with partitions establishing individual compartments for separating the mother crayfish each from the other.

4. Apparatus as defined in claim 1 to facilitate rearing of the young of spawn-producing crustaceans such as crayfish wherein said top and bottom members of said boxlike enclosure for the crayfish as well as the sidewall thereof are each constituted by frames and wherein said sidewall and bottom members of collection compartment for the newly hatched young are also constituted by a frame, all of said frames being stacked in superposed relation but being separable each from the other to facilitate cleaning.

5. Apparatus as defined in claim 4 and wherein said frame which forms the sidewall of said boxlike enclosure includes partitions establishing individual compartments for separating the mother crayfish each from the other.